United States Patent
Padmanabhan et al.

(10) Patent No.: US 11,061,630 B1
(45) Date of Patent: Jul. 13, 2021

(54) INTELLIGENT MANAGEMENT OF DATA IN PRINTING OPERATIONS

(71) Applicant: International Business Machines Corporation, Armonk, NY (US)

(72) Inventors: Girish Padmanabhan, Pune (IN); Manish Madhukarrao Tumbde, Pune (IN); Nitesh Jankilal Shreemali, Pune (IN); Mandar Dattatraya Bhuvad, Pune (IN); Sreenath Raghunath, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/738,691

(22) Filed: Jan. 9, 2020

(51) Int. Cl.
| | | |
|---|---|---|
| *G06F 3/12* | (2006.01) | |
| *H04N 1/44* | (2006.01) | |
| *G06K 9/00* | (2006.01) | |

(52) U.S. Cl.
CPC .......... *G06F 3/1222* (2013.01); *G06F 3/1238* (2013.01); *G06K 9/00442* (2013.01); *H04N 1/444* (2013.01)

(58) Field of Classification Search
CPC .................................................... G06F 3/1222
USPC ........................................................ 358/1.14
See application file for complete search history.

(56) References Cited

U.S. PATENT DOCUMENTS

| | | | |
|---|---|---|---|
| 7,620,621 B2 | 11/2009 | Fuselier | |
| 2006/0001899 A1* | 1/2006 | Kanno | H04N 1/00225 |
| | | | 358/1.14 |
| 2013/0335785 A1 | 12/2013 | Qi | |
| 2014/0165137 A1 | 6/2014 | Balinsky | |
| 2016/0105584 A1 | 4/2016 | Roche | |
| 2017/0039008 A1* | 2/2017 | Saito | G06F 3/1239 |
| 2017/0242638 A1 | 8/2017 | Seigel | |
| 2020/0183628 A1* | 6/2020 | Boo | G06F 3/1288 |

* cited by examiner

*Primary Examiner* — Jacky X Zheng
(74) *Attorney, Agent, or Firm* — Aaron N. Pontikos; Daniel R. Simek

(57) ABSTRACT

Aspects of the present invention disclose a method, computer program product, and system for managing use of information in printing events. The method includes one or more processors determining a user that is associated with the information included in a requested printing event. The method further includes one or more processors determining information associated with content of the printing event and context associated with the printing event. The method further includes one or more processors determining a sensitivity index rating for the printing event based on the information associated with content of the printing event and context associated with the printing event. In an additional embodiment, the method further includes sending a notification to the user associated with the information, the notification including an indication of the determined sensitivity index.

17 Claims, 3 Drawing Sheets

INTELLIGENT MANAGEMENT OF DATA IN PRINTING OPERATIONS

BACKGROUND OF THE INVENTION

The present invention relates generally to the field of information security, and more particularly to managing data in printing operations.

Information security is the practice of protecting information by mitigating information risks. Information security is a component of information risk management, typically involving preventing, or at least reducing. the probability of unauthorized/inappropriate access, use, disclosure, disruption, deletion/destruction, corruption, modification, inspection, recording or devaluation, of information. Additionally, information security can also involve reducing adverse impacts of incidents. Information may take any form, such as electronic or physical, tangible (e.g. paperwork), or intangible (e.g. knowledge).

Image analysis is the extraction of meaningful information from images; mainly from digital images by means of digital image processing techniques. Analyzing images utilizes a plurality of techniques, such as 2D and 3D object recognition, image segmentation, motion detection, video tracking, optical flow, number recognition, etc. In computer science, digital image processing is the use of computer algorithms to perform image processing on digital images. In addition, object recognition, with respect to computer vision technology, applies to finding and identifying objects in an image or video sequence. Object-Based Image Analysis (OBIA) employs two main processes, segmentation and classification. Traditional image segmentation is on a per-pixel basis. However, OBIA groups pixels into homogeneous objects. These objects can have different shapes and scale. Objects also have statistics associated with them which can be used to classify objects. Statistics can include geometry, context and texture of image objects. The analyst defines statistics in the classification process to generate for example land cover.

SUMMARY

Aspects of the present invention disclose a method, computer program product, and system for managing use of information in printing events. The method includes one or more processors determining a user that is associated with the information included in a requested printing event. The method further includes one or more processors determining information associated with content of the printing event and context associated with the printing event. The method further includes one or more processors determining a sensitivity index rating for the printing event based on the information associated with content of the printing event and context associated with the printing event. In an additional embodiment, the method further includes sending a notification to the user associated with the information, the notification including an indication of the determined sensitivity index.

DETAILED DESCRIPTION

Embodiments of the present invention allow for a system for identifying and managing information included in printing operations. Further, embodiments of the present invention facilitate an Internet of Things (IoT) enabled system that identifies sensitive information included in a printing event. Various embodiments of the present invention can recognize sensitive information based on content and context of a document in a printing event (e.g., name, address, phone number, photograph, contact information, etc.) and determine a degree of sensitivity (e.g., sensitivity index).

In response to determining that the degree of sensitivity exceeds a threshold, embodiments of the present invention notify an individual that is associated with the identified sensitive information. In further aspects, embodiments of the present invention can restrict the printing event until receiving authorization from the individual associated with the recognized sensitive information in the document.

Some embodiments of the present invention recognize that data and information security, with respect to personal and sensitive information, is of increasing importance. Further, embodiments of the present invention recognize that the wide availability of documents and information over the internet means that the documents and information can be available for printing without explicit knowledge of authorization by individuals that correspond to the documents and information. Accordingly, embodiments of the present invention recognize the benefits offered by an automated system to identify sensitive information included in printing operations and provide notifications to individuals that are associated with the information.

Implementation of embodiments of the invention may take a variety of forms, and exemplary implementation details are discussed subsequently with reference to the Figures.

Figure 1:
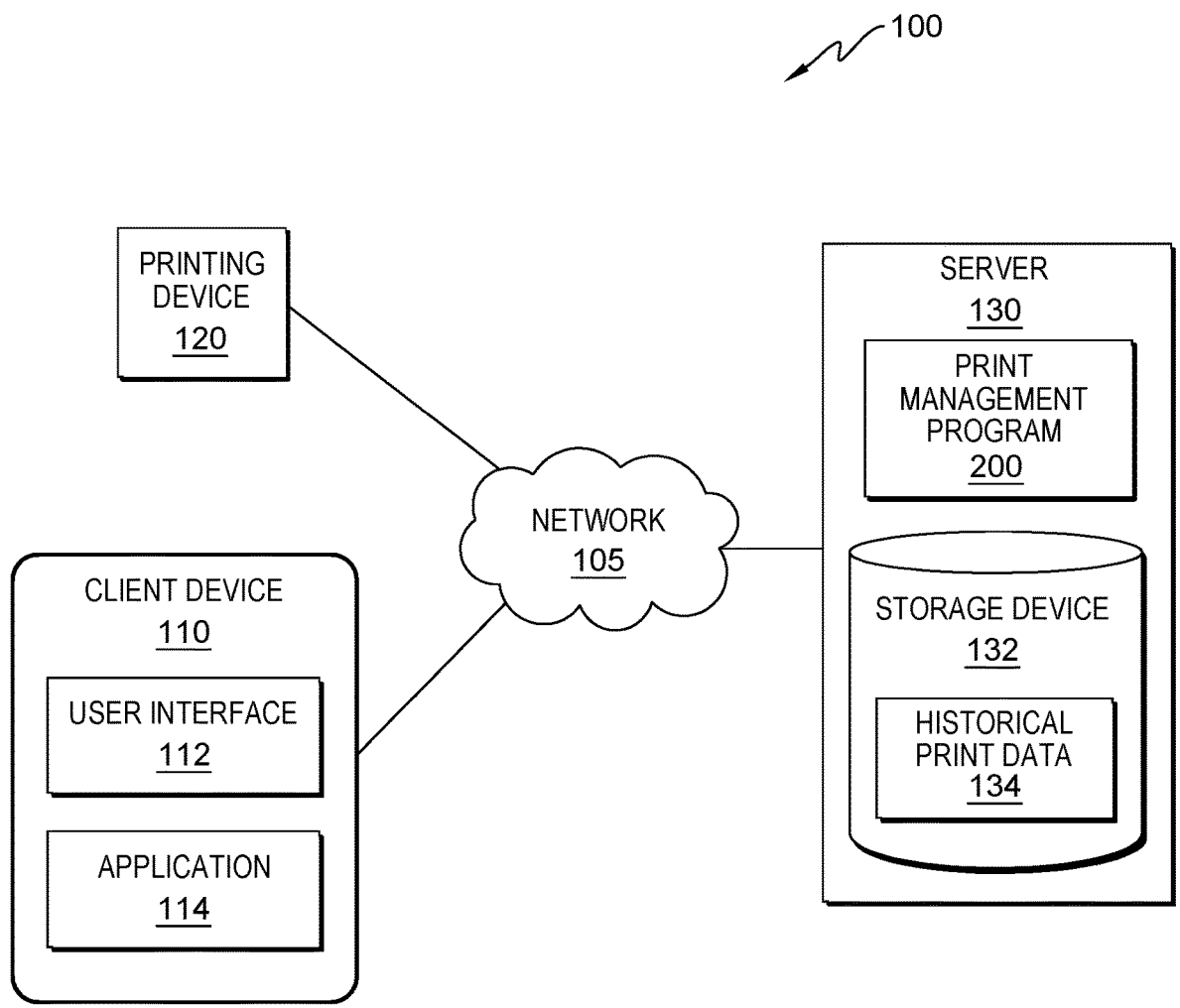
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, printing device 120, and server 130, all interconnected over network 105. In an example embodiment, server 130 provides information security and management services for an enterprise that includes printing device 120. In another example embodiment, data processing environment 100 utilizes server 130 to provide information security services to data hosted on the Internet (e.g., data associated with a user of client device 110), which can be printed by printing device 120. For example, server 130 can identify initiation of a printing event/operation that includes data that is associated with a user of client device 110, in accordance with embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, printing device 120, and server 130, in accordance with embodiments of the present invention. In various embodiments, network 105 facilitates communication among a plurality of networked computing devices (e.g., client device 110, printing device 120, and server 130), corresponding users (e.g., an individual client device 110), and corresponding management services (e.g., server 130).

In various embodiments of the present invention, client device 110 may be a workstation, personal computer, personal digital assistant, mobile phone, or any other device capable of executing computer readable program instructions, in accordance with embodiments of the present invention. In general, client device 110 is representative of any electronic device or combination of electronic devices capable of executing computer readable program instructions. Client device 110 may include components as depicted and described in further detail with respect to FIG. 3, in accordance with embodiments of the present invention. In an example embodiment, computing device 110 is a smartphone. In another example embodiment, client device 110 is a personal computer or workstation.

Client device 110 includes user interface 112 and application 114. User interface 112 is a program that provides an interface between a user of client device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on client device 110. In an example embodiment, application 114 is a client-side application of a service or enterprise associated with server 130. In another example embodiment, application 114 is a web browser that an individual utilizing client device 110 utilizes (e.g., via user interface 112) to access and provide information over network 105. For example, a user of client device 110 provides input to user interface 112 to interact with information received from server 130 (e.g., to authorize or deny a print operation that includes information associated with the user of client device 110, provide authorization of data security, etc.). In other aspects of the present invention, application 114 can be representative of applications that provide additional functionality (e.g., camera, messaging, etc.), in accordance with various aspects of the present invention.

In various embodiments of the present invention, the user of client device 110 registers with server 130 (e.g., via a corresponding application). For example, the user completes a registration process, provides information, and authorizes the collection and analysis (i.e., opts-in) of relevant data on at least client device 110, by server 130 (e.g., user profile information, user contact information, indications of information, or types of information, for server 130 to monitor for, utilizing print management program 200). In various embodiments, a user can opt-in or opt-out of certain categories of data collection. For example, the user can opt-in to provide all requested information, a subset of requested information, or no information.

In one example scenario, the user opts-in to provide a first category of information but opts-out of providing a second category of information (on all or a subset of client device 110, or other devices associated with the user (not shown)). In further scenarios, the user of client device 110 creates a user profile that includes information (e.g., name, address, contact information, identification data, etc.) that server 130, utilizing print management program 200, utilizes to determine whether identified print operations include sensitive information associated with the user. In another embodiment, a user of client device 110 can define which forms of information that server 130 will consider as sensitive information for the user (i.e., user-defined information preferences) in accordance with embodiments of the present invention.

In an example embodiment, printing device 120 is representative of a printer that is connected to network 105. For example, printing device 120 is an IoT-enabled printer that an individual can utilize to print information (e.g., from the Internet, scanned documents, copied documents, stored information, etc.), which is analyzed by server 130 utilizing print management program 200, in accordance with embodiments of the present invention. In an example scenario, printing device 120 is a printer located in an enterprise environment that is associated with server 130.

In another example embodiment, printing device 120 is representative of a computing device that an individual can utilize to request a printing event/operation. For example, an individual can utilize printing device 120 to identify information (e.g., accessible over the Internet) and request a printing event to print the information on a printer. Accordingly, server 130, utilizing print management program 200, can analyze information included in the print operation, in accordance with embodiments of the present invention. In an example scenario, printing device 120 is a printer located in an enterprise environment that is associated with server 130.

In various embodiments of the present invention, printing device 120 may be a workstation, personal computer, printer, IoT device, personal digital assistant, mobile phone, or any other device capable of executing computer readable program instructions, in accordance with embodiments of the present invention. In general, printing device 120 is representative of any electronic device or combination of electronic devices capable of executing computer readable program instructions. Printing device 120 may include components as depicted and described in further detail with respect to FIG. 3, in accordance with embodiments of the present invention.

In example embodiments, server 130 can be a desktop computer, a computer server, or any other computer systems, known in the art. In certain embodiments, server 130 represents computer systems utilizing clustered computers and components (e.g., database server computers, application server computers, etc.) that act as a single pool of seamless resources when accessed by elements of data processing environment 100 (e.g., client device 110, printing device 120). In general, server 130 is representative of any electronic device or combination of electronic devices capable of executing computer readable program instructions. Server 130 may include components as depicted and described in further detail with respect to FIG. 3, in accordance with embodiments of the present invention.

Server 130 includes print management program 200 and storage device 132, which includes historical print data 134. In various embodiments, server 130 can be a management server that provides support (e.g., via print management program 200) to an enterprise environment, in accordance with embodiments of the present invention. In additional embodiments, server 130 is a server that can monitor various data sources (e.g., via print management program 200) on the Internet for printing events that include sensitive information of users, in accordance with various embodiments of the present invention.

In example embodiments, print management program 200 manages use of sensitive information in printing events, in accordance with an embodiment of the present invention. In various embodiments, print management program 200 determines whether a printing event includes sensitive information. In response to determining that the printing event does include sensitive information, print management program 200 gathers data associated with the printing event and determined a corresponding sensitivity index rating. Further, in response to the sensitivity index of the printing event exceeding a threshold, print management program 200 notifies a user associated with the sensitive information and stores relevant information.

In example embodiments, server 130 utilizes storage device 132 to store information associated with analyzed printing events (e.g., historical print data 134), user-provided information (e.g., user profile data, user preferences, encrypted user information, etc.), and other data that print management program 200 can utilize, in accordance with embodiments of the present invention. Storage device 132 can be implemented with any type of storage device, for example, persistent storage 305, which is capable of storing data that may be accessed and utilized by server 130, such as a database server, a hard disk drive, or a flash memory. In other embodiments, storage device 132 can represent multiple storage devices and collections of data within server 130.

In various embodiments, storage device 132 includes information that print management program 200 can access and utilize, in accordance with embodiments of the present invention. In further embodiments, storage device 132 includes information associated with users that are registered server 130 and/or print management program 200 (e.g., data associated with a user of client device 110, provided and/or defined during registration with the system of server 130). In another embodiment, storage device 132 includes indications of co-owners of data. For example, during registration, the user associated with client device 110 indicates that another user (not shown) is also associated with one or more pieces of sensitive information. In another example scenario, multiple users provide server 130 with registration information that associated with a shared (and validated) piece of sensitive information (e.g., an address, joint account, etc.).

In example embodiments, historical print data 134 is representative of aggregated data, stored within storage device 132 of server 130, which is associated with previous print events that server 130 has analyzed (e.g., utilizing print management program 200). Accordingly, historical print data 134 includes derived information from historical print events identified by server 130, in accordance with various embodiments of the present invention. Historical print data 134 can include data derived from print events that include sensitive information and print events that do not include sensitive information. In addition, historical print data 134 can include data derived from print events that were authorized to execute and print events that were declined (i.e., not authorized to execute), according to embodiments of the present invention.

In an example aspects, server 130 (e.g., via print management program 200) derives historical print data 134 from print events accessible to server, such as data including: individuals associated with a print event (e.g., individuals associated with the data in the print event, individuals requesting and/or performing the print event, etc.), a location associated with the print event (e.g., a location of printing device 120, location of the print event request, defined locations, such as offices or residential locations, etc.), type of data included in the print event (e.g., contact information, identification information, credit card number, address, etc.), a time of day for the printing event (e.g., during business hours or not, etc.), a purpose of the print event (e.g., why an individual is requesting to print information), etc.

Figure 2:
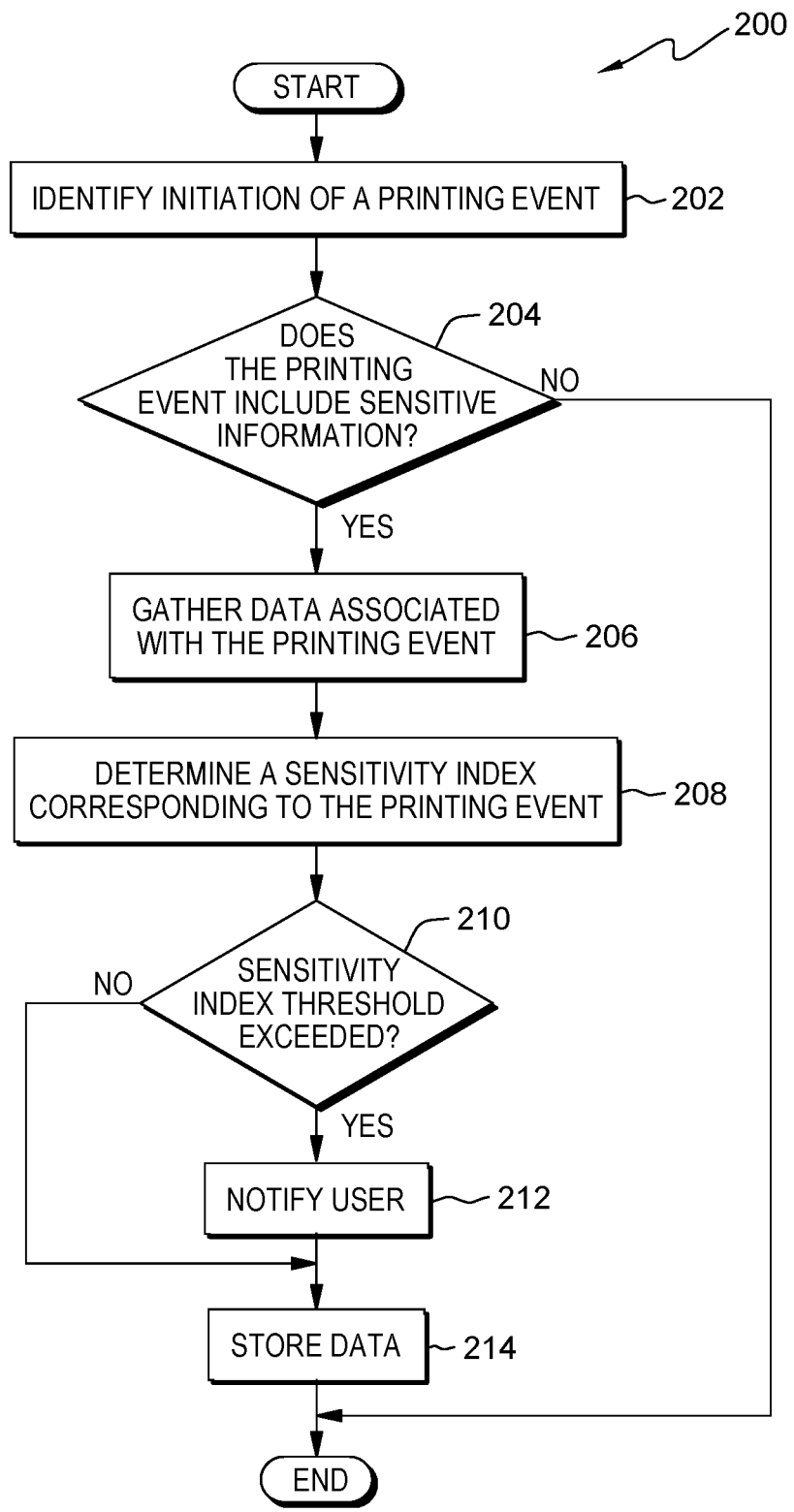
FIG. 2 is a flowchart depicting operational steps of a program for managing use of sensitive information in printing events, in accordance with embodiments of the present invention.

FIG. 2 is a flowchart depicting operational steps of print management program 200, a program for managing use of sensitive information in printing events, in accordance with embodiments of the present invention. In one embodiment, print management program 200 monitors information that a user (e.g., a user of client device 110) has registered with server 130. For example, print management program 200 monitors for printing operations that include data, accessible at one or more locations of the Internet, associated with the user of client device 110. In another embodiment, print management program 200 analyzes printing operations in an enterprise environment. For example, print management program 200 analyzed printing events requested for IoT-enabled printers (e.g., printing device 120) in an enterprise environment, such as an office building.

In step 202, print management program 200 identifies initiation of a printing event. In one embodiment, print management program 200 identifies that a printing event initiates associated with printing device 120. In an example scenario, print management program 200 identifies that printing device 120 receives a request to print information (i.e., a printer receives a request for a printing event). In another example scenario, print management program 200 identifies that printing device 120 submits a request to print information (i.e., a user utilizes a computing device to select to print information).

In decision step 204, print management program 200 determines whether the printing event includes sensitive information. In one embodiment, print management program 200 analyzes the context and content included in the printing event in determining whether the printing event includes sensitive information. In various embodiments, print management program 200 analyzes documents included in the printing event to identify one or more types of information included in the documents.

In an example embodiment, print management program 200 utilizes object recognition to identify content of the printing event that can include sensitive information. For example, print management program 200 utilizes object recognition techniques to identify whether the printing event includes a document of a certain type, such as a driver's license, passport, or other form of identification that can includes sensitive information. Print management program 200 can access and utilize a database of know documents and document types as the basis of an object recognition comparison (e.g., in storage device 132 or a remotely accessible database not shown). In additional embodiments, print management program 200 can identify and analyze text formatting of documents in the printing event to determine whether the text formatting indicates sensitive information (e.g., the text formatting corresponds to known format of sensitive information).

In another example embodiment, print management program 200 performs a contextual analysis of the content include in the documents of the printing event. For example, print management program 200 can parse text included in the printing event and derive contextual information from text of the document. In an example scenario, print management program 200 parses text in the printing event to identify sensitive information, such as names, email addresses, address information, financial data, etc.

In an additional embodiment, print management program 200 parses the printing event to identify information that users associated with server 130 have indicated to be sensitive information. For example, the user of client device 110 has provided indications of sensitive information to server 130 (e.g., user preferences provided during registration). In this example, print management program 200 searches for indications of the indicated sensitive information in printing events (accessible to server 130). In response to determining that the printing event does not include sensitive information (decision step 204, NO branch), print management program 200 ends.

In step 206, print management program 200 gathers data associated with the printing event. More specifically, in response to determining that the printing event does includes sensitive information (decision step 204, YES branch), print management program 200 gathers data associated with the printing event. In an example embodiment, in response to determining that the printing event does include sensitive information (decision step 204, YES branch), print management program 200 intercepts the printing event and establishes a hold on execution of the printing event. In one embodiment, print management program 200 determines one or more users that are associated with the sensitive information. In various embodiments, print management program 200 can utilizes parsed content and contextual information to derive one or more users that are associated with the sensitive information (e.g., text analytics).

In another embodiment, print management program 200 utilizes user-provided registration information to identify the one or more users (e.g., user preferences, user-indicated sensitive information, etc.) In an additional embodiment, print management program 200 can identify the one or more users that are associated with the sensitive information based on a network location of the data included in the printing event (e.g., analyze data a data source and corresponding users). In an example scenario, can identify co-owners associated with the sensitive information. For example, in response to identifying sensitive information that includes an address, print management program 200 can utilize publicly accessible information and/or user-provided information to identify multiple users that are associated with the address (e.g., co-owners of real estate, etc.).

In various embodiments, print management program 200 utilizes IoT capabilities of printing device 120 and information derived in step 204 (object recognition, contextual analysis, text analysis, etc.) to determine data associated with the printing event. Accordingly, print management program 200 can analyze documents to-be-printed in the printing event to derive print data.

In example embodiments, print management program 200 can derive print data that includes one or a combination of: individuals associated with a print event (e.g., individuals associated with the data in the print event, individuals requesting and/or performing the print event, etc.), a location associated with the print event (e.g., a location of printing device 120, location of the print event request, defined locations, such as offices or residential locations, etc.), type of data included in the print event (e.g., contact information, identification information, credit card number, address, etc.), a time of day for the printing event (e.g., during business hours or not, etc.), a purpose of the print event (e.g., why an individual is requesting to print information), etc. In various aspects of the present invention, print management program 200 can derive a who, what, where, when, why, and how associated with the printing event. Alternatively, print management program 200 can identify one or more factors/data associated with the printing event as "unknown," when applicable.

In a first example scenario, print management program 200 determines that the printing event includes an identification card (i.e., what) that includes sensitive information and identifies one or more user that correspond to the sensitive information (e.g., who is identified in the information). Print management program 200 can also identify one or more of the user requesting the print event and/or whether the requesting user is authorized to print the sensitive information. In this scenario, print management program 200 determines that the requesting user is not authorized and also determines that the printing event is requested after business hours (i.e., when) and at an office location (i.e., where). Print management program 200 can also identify a requesting location of the printing event (i.e., an originating location of the request). In addition, print management program 200 can identify information associated with the context of the printing event and a user requesting the printing event to predict why the printing event is occurring.

In a second example scenario, print management program 200 determines that the printing event includes an identification card (i.e., what) that includes sensitive information and identifies one or more user that correspond to the sensitive information (e.g., who is identified in the information). In this example scenario, print management program 200 determines that the requesting user is authorized to print the identification card and that the printing event is requested during business hours (i.e., when) and within an office location (i.e., where). In addition, print management program 200 can determine that a user that corresponds to the sensitive information is in proximity to printing device 120 (e.g., the user is at the office location, based on user-provided information). Print management program 200 can also identify information associated with the data source for the printing event (e.g., printing data from a bank associated with the user, or other business establishment) to derive why the printing event is initiating.

In step 208, print management program 200 determines a sensitivity index corresponding to the printing event. In one embodiment, print management program 200 determines a sensitive index rating based on gathered data associated with the printing event (from step 206). In example embodiments, print management program 200 utilizes a proximity of where data is being printed (e.g., based on printing device 120), who is initiating the printing event, a relationship of time and the data being printed, and an estimated purpose of printing the data. In additional embodiments, print management program 200 utilizes historical information in historical print data 134 to identify factors that are relevant to printing events that include sensitive information.

In various embodiments, print management program 200 can determine whether the printing event corresponds to a "high" sensitivity index rating, or a "low" sensitivity index rating. In alternate embodiments, print management program 200 can utilize other sensitivity index labels or ratings (e.g., as defined by users, server 130, an enterprise environment, etc.), in accordance with various embodiments of the present invention. For example, a user of client device 110 can define that if gathered data associated with a printing event includes at least one factor that the user has not previously authorized (e.g., in user preferences or historical print data 134), then the sensitivity index is high, and otherwise, the sensitivity index is low. In alternate examples, the user of client device can define different specification for the sensitivity index (e.g., at least two factors, etc.).

For example, in the previously discussed first example scenario, print management program 200 determines that the requesting user is not authorized and also determines that the printing event is requested after business hours and at an office location. Accordingly, print management program 200 determines a sensitivity index of "high" based on the gathered data (i.e., at least one factor not authorized, such as the requesting user and/or after business hours). In another example, in the previously discussed second example, print management program 200 determines that the requesting user is authorized to print the identification card and that the printing event is requested during business hours and within an office location. Print management program 200 also analyzes additional gathered data associated with the printing event (from step 206). Accordingly, print management program 200 determines a sensitivity index of "low" based on the gathered data (e.g., user has previously authorized the gathered data).

In another example scenario, print management program 200 determined (in step 206) that the printing event includes a passport, is requested in the evening (e.g., after a defined time frame), by an unknown individual, and in an unidentified location. In this example scenario, print management program 200 determines a sensitivity index of "high." In an additional example scenario, print management program 200 determined (in step 206) that the printing event includes a passport, being printed during office hours at a passport office, by an employee of the passport office that is associated (i.e., a relationship) with an account of the user of client device 120. In this example scenario, print management program 200 determines a sensitivity index of "low."

In decision step 210, print management program 200 determines whether the sensitivity index associated with the printing event exceeds a threshold. In one embodiment, print management program 200 determines whether the determines sensitivity index (determined in step 210) exceeds a predefined threshold. In an example embodiment, print management program 200 utilizes a default minimum sensitivity index threshold (e.g., above a "low" sensitivity index, a numerical value, a number of unauthorized factors, etc.). In another example embodiment, print management program 200 utilizes user-defined threshold values (in storage device 132) to determine whether a determined sensitivity index exceeds a threshold. For example, the user associated with client device 110, during registration with server 130, defines a minimum sensitivity index threshold value (e.g., defines a minimum sensitivity index value of "low"). In response to determining that the determined sensitivity index does not exceed a threshold (decision step 210, YES branch), print management program 200 stores data associated with the printing event.

With regard to the previously discussed first example scenario, print management program 200 determined (in step 208) a sensitivity index of "high." Print management program 200 can then compare the determined sensitivity index of "high" to a defined minimum sensitivity index threshold. For example, print management program 200 determines that the determined sensitivity index is above a "low" sensitivity index threshold.

With regard to the previously discussed second example scenario, print management program 200 determined (in step 208) a sensitivity index of "low." Print management program 200 can then compare the determined sensitivity index of "low" to a defined minimum sensitivity index threshold. For example, print management program 200 determines that the determined sensitivity index is not above a "low" sensitivity index threshold.

In step 212, print management program 200 notifies the user. More specifically, in response to determining that the determined sensitivity index exceeds a threshold (decision step 210, YES branch), print management program 200 notifies the user associated with the sensitive information. For example, in response to determining that the sensitivity index exceeds a threshold (decision step 210, YES branch), print management program 200 sends a notification to the user of client device 110 regarding the printing event (identified in step 202). In another example, print management program 200 can notify another authorized user, such as a co-owner of the sensitive information, a system/enterprise administrator, etc. In various embodiments, print management program 200 can provide a notification that indicates information including: that the printing event is requested, a type of sensitive information included in the printing event, information from the gathered data (from step 206), and other information (e.g., based on user and/or preferences).

In an additional embodiment, print management program 200 can place a hold on the printing event (i.e., restrict execution of the printing event) until receiving authorization from a user associated with the sensitive information. In an example embodiment, in response to determining that an identified printing event includes sensitive information (decision step 204, YES branch), print management program 200 places a hold on execution of the printing event. Then, in response to determining that the sensitivity index corresponding to the printing event exceeds a threshold (decision step 210, YES branch), print management program 200 sends a notification to one or more users associated with the sensitive information. In this example embodiments, print management program 200 generates the notification to include an option to authorize execution of the printing event (i.e., approve and release hold) or to reject and terminate the printing event (e.g., cancel printing event, send notifications to additional users and/or entities).

In step 214, print management program 200 stores data. In one embodiment, print management program 200 stores data associated with the printing event in storage device 132 and historical print data 134. In various embodiments, print management program 200 encrypts data associated with the printing event (e.g., user information, gathered data, sensitivity index, authorization or denial of event, etc.) and stores the encrypted data in historical print data 134 for future iterations and operations.

In example embodiments, print management program 200 tags gathered data associated with the printing event with an indication of the determined sensitivity index data, the gathered data including a proximity of where data is being printed (e.g., based on printing device 120), who is initiating the printing event, a relationship of time and the data being printed, and an estimated purpose of printing the data, etc. In additional embodiments, a notified user (notified in step 212) can provide user feedback information and a response to the received notification (e.g., authorizing or denying execution of the printing event). Print management program 200 can encrypt and store information provided by users in storage device 132 and historical print data 134, associated with the users and/or the corresponding printing event.

Figure 3:
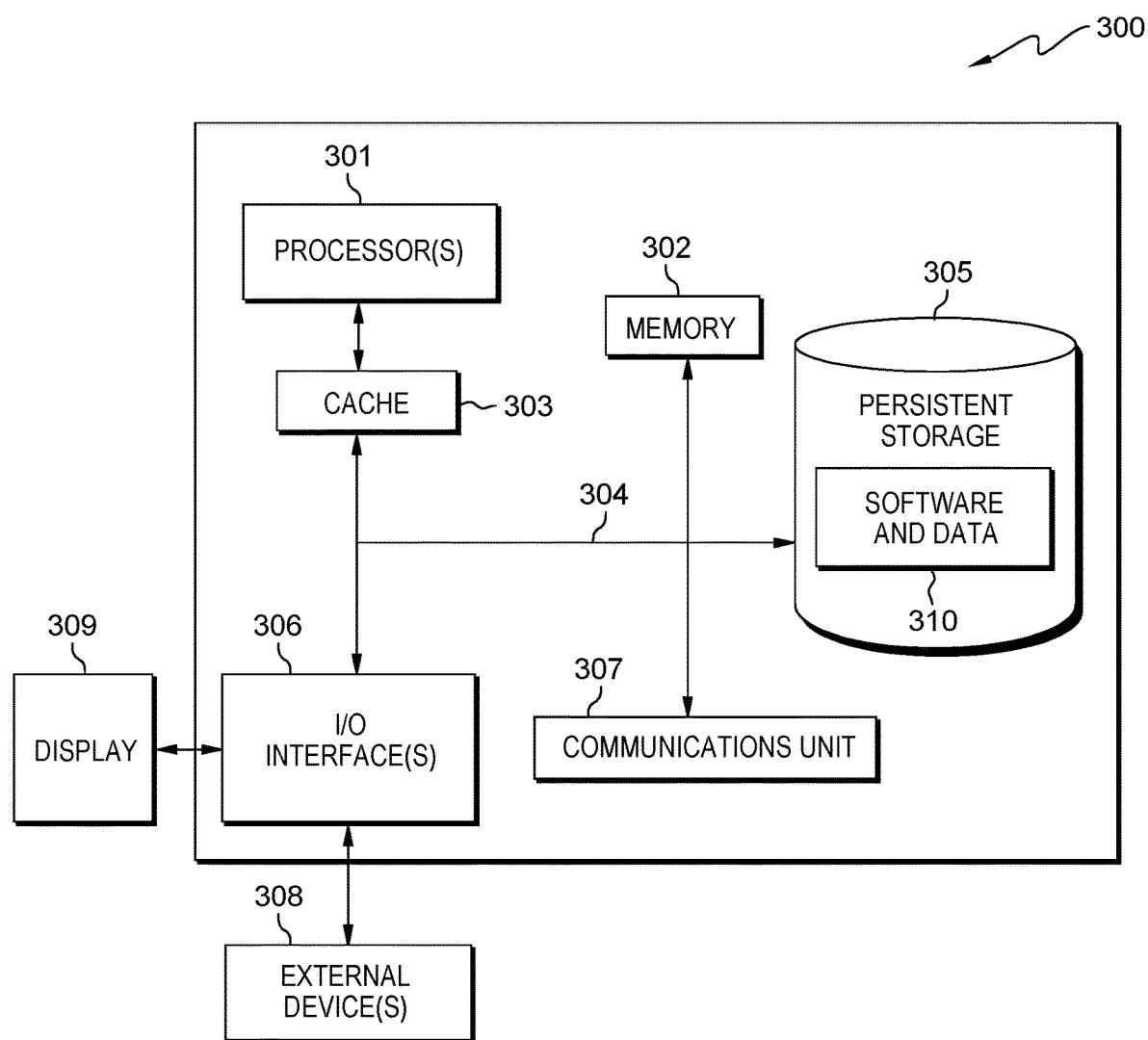
FIG. 3 depicts a block diagram of components of a computing system representative of the client device, printing device, and server of FIG. 1, in accordance with an embodiment of the present invention.

FIG. 3 depicts computer system 300, which is representative of client device 110, printing device 12, and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 110, software and data 310 includes user interface 112 and application 114. With respect to server 130, software and data 310 includes print management program 200 and historical print data 134.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   in response to determining that a printing event includes sensitive information, determining, by one or more processors, a user that is associated with the sensitive information;
   determining, by one or more processors, information associated with content of the printing event and context associated with the printing event, wherein determining information associated with content of the printing event and context associated with the printing event further comprises:
      determining, by one or more processors, contextual information associated with the printing event, the contextual information including a user that requested the printing event, a time of the printing event, and a location associated with the printing event, and
      wherein the contextual information is derived utilizing data received from an Internet of Things (IoT) enabled printing device; and
   determining, by one or more processors, a sensitivity index rating for the printing event based on the information associated with content of the printing event and context associated with the printing event.

2. The method of claim 1, further comprising:
sending, by one or more processors, a notification to the user associated with the sensitive information, the notification including an indication of the determined sensitivity index.

3. The method of claim 2, wherein the notification includes an option to authorize execution of the printing event and an option to reject the printing event.

4. The method of claim 1, further comprising:
identifying, by one or more processors, a document type included in the printing event utilizing object recognition; and
determining, by one or more processors, that the identified document type includes sensitive information.

5. The method of claim 1, wherein determining information associated with content of the printing event and context associated with the printing event further comprises:
determining, by one or more processors, a co-owner user that is associated with the sensitive information.

6. The method of claim 1, wherein determining a sensitivity index rating for the printing event further comprises:
determining, by one or more processors, the sensitivity index rating utilizing historical printing event data.

7. A computer program product comprising:
one or more computer readable storage media and program instructions stored on the one or more computer readable storage media, the program instructions comprising:
in response to determining that a printing event includes sensitive information, program instructions to determine a user that is associated with the sensitive information;
program instructions to determine information associated with content of the printing event and context associated with the printing event, wherein the program instructions to determine information associated with content of the printing event and context associated with the printing event further comprise program instructions to:
determine contextual information associated with the printing event, the contextual information including a user that requested the printing event, a time of the printing event, and a location associated with the printing event, and
wherein the contextual information is derived utilizing data received from an Internet of Things (IoT) enabled printing device; and
program instructions to determine a sensitivity index rating for the printing event based on the information associated with content of the printing event and context associated with the printing event.

8. The computer program product of claim 7, further comprising program instructions, stored on the one or more computer readable storage media, to:
send a notification to the user associated with the sensitive information, the notification including an indication of the determined sensitivity index.

9. The computer program product of claim 7, further comprising program instructions, stored on the one or more computer readable storage media, to:
identify a document type included in the printing event utilizing object recognition; and
determine that the identified document type includes sensitive information.

10. The computer program product of claim 7, wherein the program instructions to determine information associated with content of the printing event and context associated with the printing event further comprise program instructions to:
determine a co-owner user that is associated with the sensitive information.

11. The computer program product of claim 8, wherein the notification includes an option to authorize execution of the printing event and an option to reject the printing event.

12. The computer program product of claim 7, wherein the program instructions to determine a sensitivity index rating for the printing event further comprise program instructions to:
determine the sensitivity index rating utilizing historical printing event data.

13. A computer system comprising:
one or more computer processors;
one or more computer readable storage media; and
program instructions stored on the computer readable storage media for execution by at least one of the one or more processors, the program instructions comprising:
in response to determining that a printing event includes sensitive information, program instructions to determine a user that is associated with the sensitive information;
program instructions to determine information associated with content of the printing event and context associated with the printing event, wherein the program instructions to determine information associated with content of the printing event and context associated with the printing event further comprise program instructions to:
determine contextual information associated with the printing event, the contextual information including a user that requested the printing event, a time of the printing event, and a location associated with the printing event, and
wherein the contextual information is derived utilizing data received from an Internet of Things (IoT) enabled printing device; and
program instructions to determine a sensitivity index rating for the printing event based on the information associated with content of the printing event and context associated with the printing event.

14. The computer system of claim 13, further comprising program instructions, stored on the computer readable storage media for execution by at least one of the one or more processors, to:
send a notification to the user associated with the sensitive information, the notification including an indication of the determined sensitivity index.

15. The system of claim 14, wherein the notification includes an option to authorize execution of the printing event and an option to reject the printing event.

16. The computer system of claim 13, further comprising program instructions, stored on the computer readable storage media for execution by at least one of the one or more processors, to:
identify a document type included in the printing event utilizing object recognition; and
determine that the identified document type includes sensitive information.

17. The computer system of claim 13, wherein the program instructions to determine information associated with content of the printing event and context associated with the printing event further comprise program instructions to:

determine a co-owner user that is associated with the sensitive information.

\* \* \* \* \*